（12） United States Patent
Wenner (10) Patent No.: US 11,984,791 B2
(45) Date of Patent: May 14, 2024

(54) AUXILIARY POWER SOURCE FOR ELECTRIC VEHICLES

(71) Applicant: Frank William Wenner, Anderson Island, WA (US)

(72) Inventor: Frank William Wenner, Anderson Island, WA (US)

( * ) Notice: Subject to any disclaimer, the term of this patent is extended or adjusted under 35 U.S.C. 154(b) by 0 days.

(21) Appl. No.: 18/090,238

(22) Filed: Dec. 28, 2022

(65) Prior Publication Data

US 2023/0268799 A1 Aug. 24, 2023

Related U.S. Application Data

(60) Provisional application No. 63/313,615, filed on Feb. 24, 2022.

(51) Int. Cl.
*H02K 7/00* (2006.01)
*B60K 1/04* (2019.01)
*H02J 7/14* (2006.01)
*H02K 7/02* (2006.01)

(52) U.S. Cl.
CPC ............... *H02K 7/006* (2013.01); *B60K 1/04* (2013.01); *H02J 7/1423* (2013.01); *H02K 7/025* (2013.01)

(58) Field of Classification Search
CPC ....... H02K 7/006; H02K 7/025; H02J 7/1423; B60K 2001/04
See application file for complete search history.

(56) References Cited

U.S. PATENT DOCUMENTS

| 4,410,060 A * | 10/1983 | Cunard | B62M 6/60 180/220 |
| 2008/0066979 A1* | 3/2008 | Carter | B60L 58/22 180/65.51 |
| 2011/0156620 A1* | 6/2011 | Yeh | H02J 7/1423 307/10.7 |
| 2012/0083375 A1* | 4/2012 | Lo | B60K 7/0007 475/149 |
| 2012/0161497 A1* | 6/2012 | He | B60L 50/30 301/6.5 |
| 2012/0192784 A1* | 8/2012 | Gimlan | H02K 7/025 180/68.5 |
| 2017/0008335 A1* | 1/2017 | Howard | B60T 8/17616 |

* cited by examiner

*Primary Examiner* — Sean Gugger
(74) *Attorney, Agent, or Firm* — Barry Choobin; Patent 360

(57) ABSTRACT

An assembly as an auxiliary source of power for an electric vehicle that can generate free energy. The assembly includes a housing that allows the assembly to be mounted to a wheel of the electric vehicle. The assembly includes a plurality of first batteries mounted to the housing; a charging circuitry configured to charge the plurality of first batteries; a shaft mounted to the housing, wherein the shaft is freely rotatable relative to the housing; an electric generator mounted to the shaft and the housing, wherein the electric generator rotates with the shaft for generating electricity; and a flywheel mounted to the shaft, the flywheel configured to rotate the shaft.

18 Claims, 6 Drawing Sheets

AUXILIARY POWER SOURCE FOR ELECTRIC VEHICLES

CROSS-REFERENCE TO RELATED APPLICATIONS

This application claims priority from a U.S. Provisional Patent Appl. No. 63/313,615 filed on Feb. 24, 2022, which is incorporated herein by reference in its entirety.

FIELD OF INVENTION

The present invention relates to an auxiliary power source for electric vehicles, and more particularly, the present invention relates to a wheel-mounted auxiliary power source.

BACKGROUND

Electrically operated vehicles are becoming popular due to several factors, the primary being the rising cost and limited availability of fossil fuels, global warming due to the burning of fossil fuels, and the pollution caused by fossil fuels. The innovations in electric vehicles aim to add all the advantages of conventional engine vehicles, such as power but do not have the drawbacks, such as pollution. The running cost of electric vehicles is also exceptionally low compared to fossil fuels. Moreover, electricity can be supplied to remote areas, and charging stations are economical to set up.

Despite many advantages of electric vehicles over fossil fuel-based vehicles, electric vehicles suffer from one major drawback i.e., the long charging time. It may take hours to charge an electric vehicle compared to a few minutes in refilling the gas. Current research and developments in electric vehicles primarily aim at reducing the charging time and increasing the range of electric vehicles. Failure of batteries is another drawback with electric vehicles.

A need is therefore appreciated for increasing the range of electric vehicles and emergency power backup by providing an auxiliary source of power.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an assembly for increasing the range of electric vehicles.

It is another object of the present invention that the assembly provides an auxiliary source of power.

It is still another object of the present invention that the assembly can power the electric vehicle during an emergency or failure of primary batteries.

It is a further object of the present invention that the assembly does not occupy any cabin or luggage space.

It is yet another object of the present invention that the efficiency of the electric vehicle can be improved.

In one aspect, disclosed is an assembly for electric vehicles that acts as an auxiliary source of power. The disclosed assembly can enhance the overall energy efficiency of an electric vehicle, improve overall range, and provide a power backup in case the primary battery of the electric vehicle fails or gets discharged. The disclosed assembly can be mounted to one or more wheels of the electric vehicle.

In one aspect, disclosed is an assembly for an electric vehicle, the assembly comprising a housing configured to be mounted to a wheel of the electric vehicle; a plurality of first batteries mounted to the housing; a charging circuitry configured to charge the plurality of first batteries; a shaft mounted to the housing, wherein the shaft is freely rotatable relative to the housing; an electric generator mounted to the shaft and the housing, wherein the electric generator rotates with the shaft for generating electricity; and a flywheel mounted to the shaft, the flywheel configured to rotate the shaft. The housing is made from plastic. The plurality of first batteries comprises batteries in multiple of four, the plurality of first batteries is radially arranged and evenly spaced from each other. The plurality of first batteries comprises eight batteries. The plurality of first batteries are C size or D size batteries. The charging circuitry is configured to trickle charge one or more second batteries, the one or more second batteries are of the electric vehicle. The charging circuitry is configured to power an electric motor of the electric vehicle using the power stored in the plurality of first batteries. The plurality of first batteries are rechargeable batteries.

In one aspect, disclosed is a method for generating electricity, the method comprising providing an assembly for the electric vehicle, the assembly comprising: a housing configured to be mounted to a wheel of the electric vehicle, a plurality of first batteries mounted to the housing, a charging circuitry configured to charge the plurality of first batteries, a shaft mounted to the housing, wherein the shaft is freely rotatable relative to the housing, an electric generator mounted to the shaft and the housing, wherein the electric generator rotates with the shaft for generating electricity, and a flywheel mounted to the shaft, the flywheel configured to rotate the shaft; mounting the assembly to the wheel of the electric vehicle; and moving the electric vehicle, wherein rotation of the wheel of the electric vehicle causes the flywheel to rotate.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Disclosed is an assembly for electric vehicles that can be mounted to the wheels and provides an auxiliary power generation and storage source. The disclosed assembly does not occupy any space inside the vehicle but can be mounted to the wheels of the vehicle. The disclosed assembly can extend the operative time i.e., the range of the vehicle. The disclosed assembly can also provide for an emergency power supply in case of the primary power source failure or when the primary batteries of the vehicle get discharged. The vehicle herein refers to an electric vehicle and the terms 'vehicle' and 'electric vehicle' are interchangeably used hereinafter. The disclosed assembly includes power storage that can power the electric vehicle at least for a short distance when the main battery fails, and the vehicle comes to a standstill. For example, the vehicle can be safely parked on side of the road or nearby parking using power from the disclosed assembly. Also, the disclosed assembly may allow the vehicle to reach a nearby charging point or service station, thus saving time, and preventing the need for a towing truck. Any traffic disturbance due to a standstill vehicle in the middle of the road can also be avoided. The disclosed assembly can also provide for trickle charging of the main battery, thus improving the economy of the vehicle. The disclosed assembly can provide for energy generation independent of the motors of the vehicle, thus free energy can be made available for charging the main batteries. Trickle charging of the main batteries can also enhance the battery health and thus life of the battery.

Figure 1:
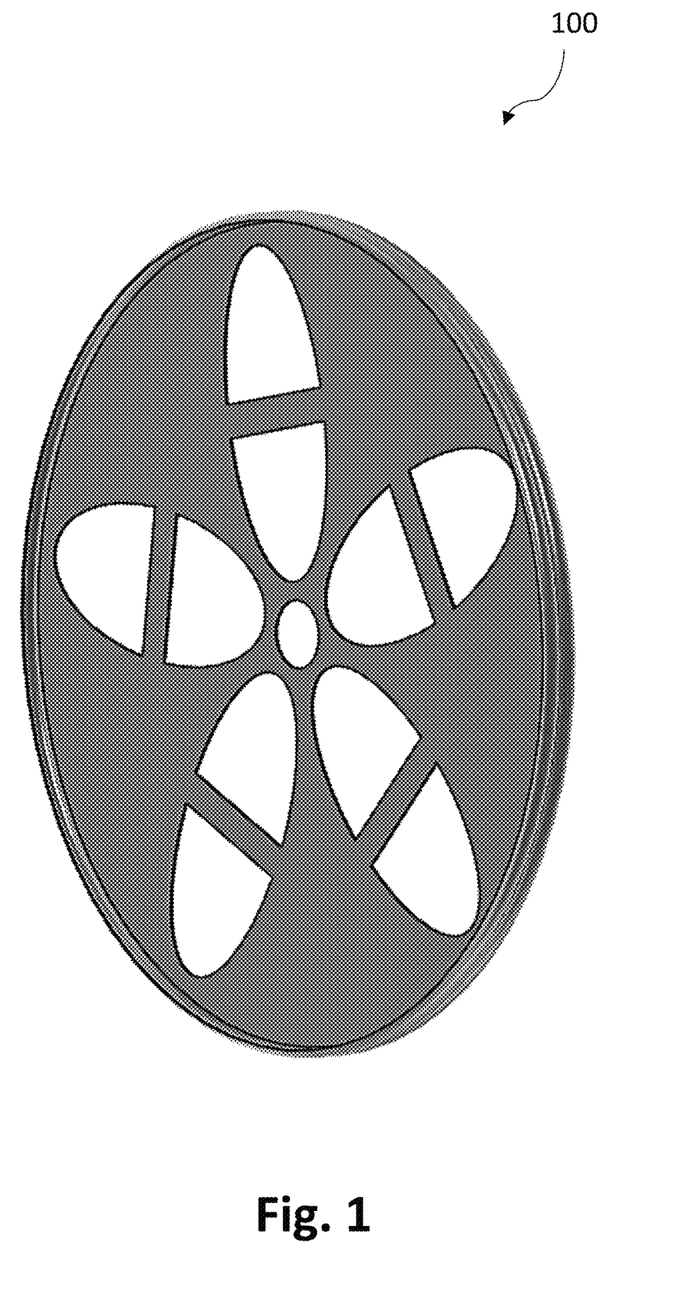
FIG. 1 is a perspective view of a flywheel, according to an exemplary embodiment of the present invention.
Figure 2:
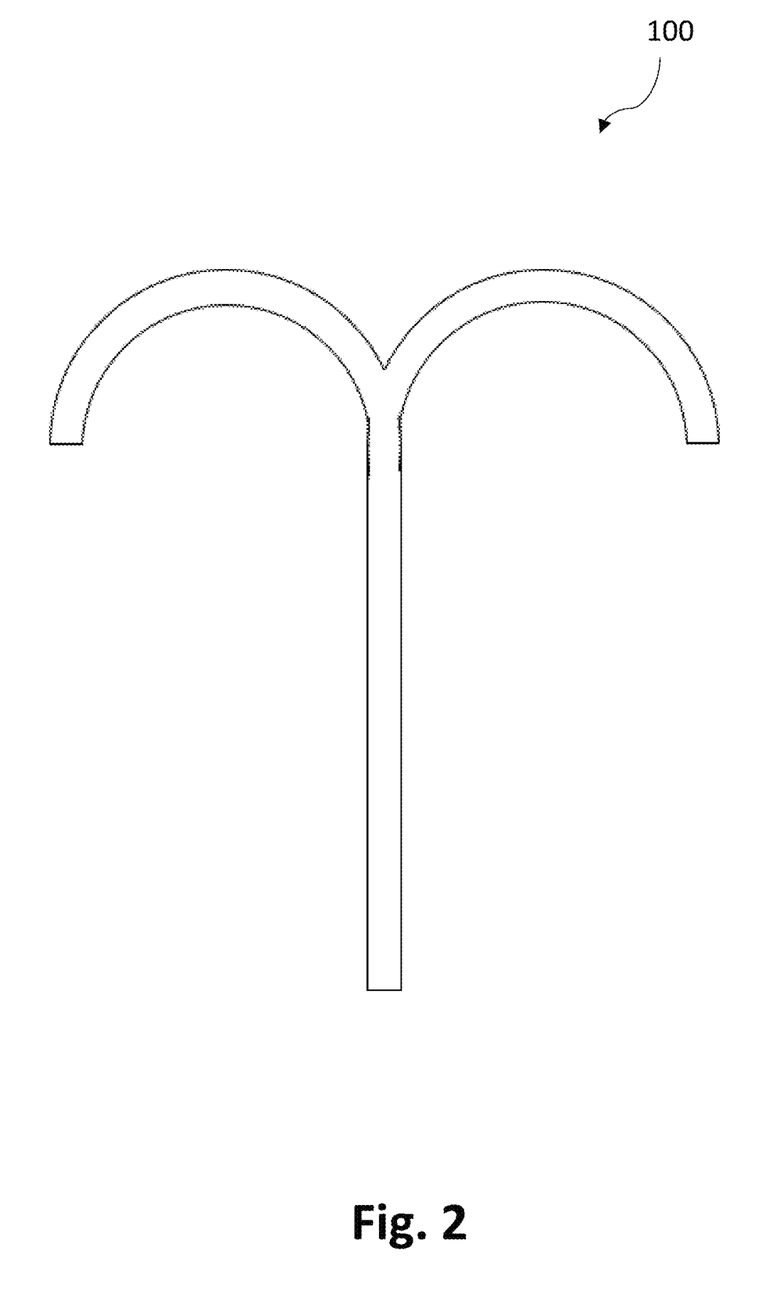
FIG. 2 is a sectional view of the flywheel, according to an exemplary embodiment of the present invention.
Figure 3:
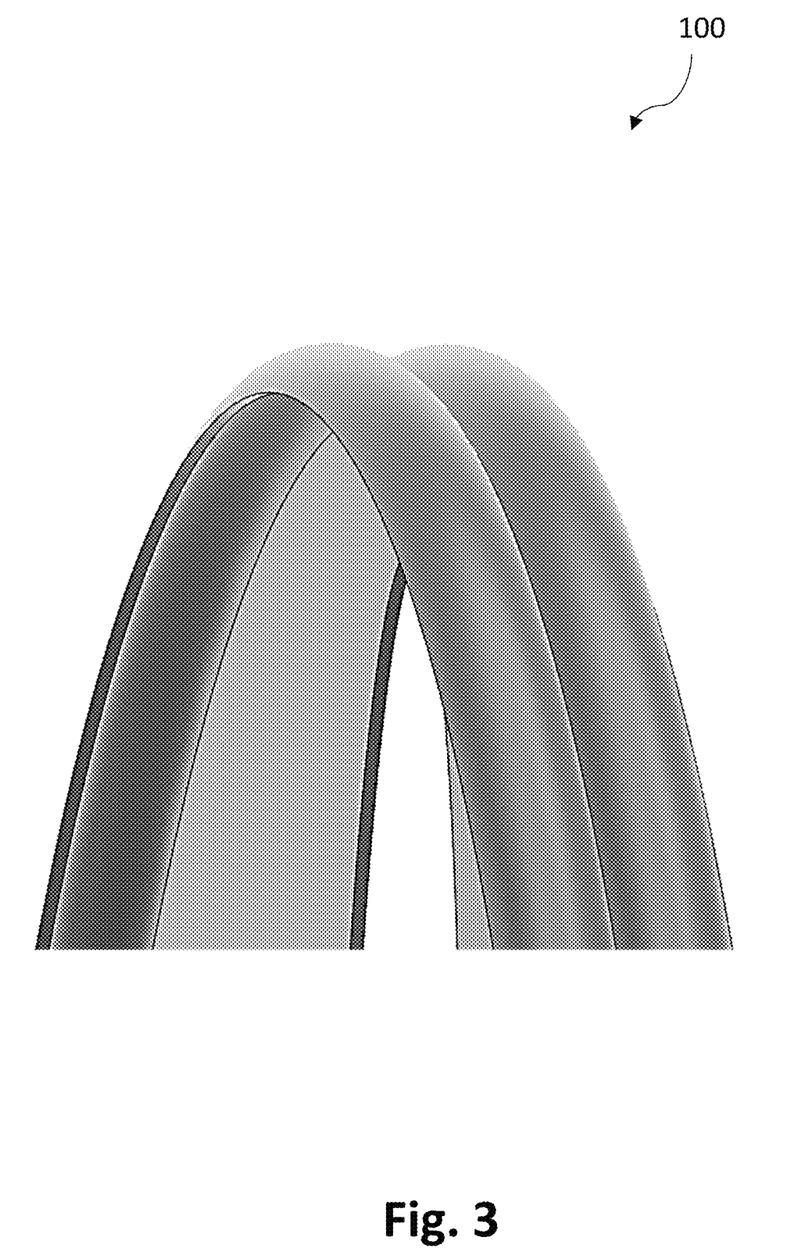
FIG. 3 is an enlarged view of the flywheel, according to an exemplary embodiment of the present invention.

Referring to FIGS. 1-3, show an exemplary embodiment of a flywheel 100. The flywheel 100 is a core of the disclosed assembly that drives the motor for generating electrical energy. The flywheel is designed in such a way that it can rotate faster than the wheel to which the disclosed assembly is mounted. The flywheel is coupled to the rotor of an electric generator and rotates the rotor for generating electricity.

Figure 4:
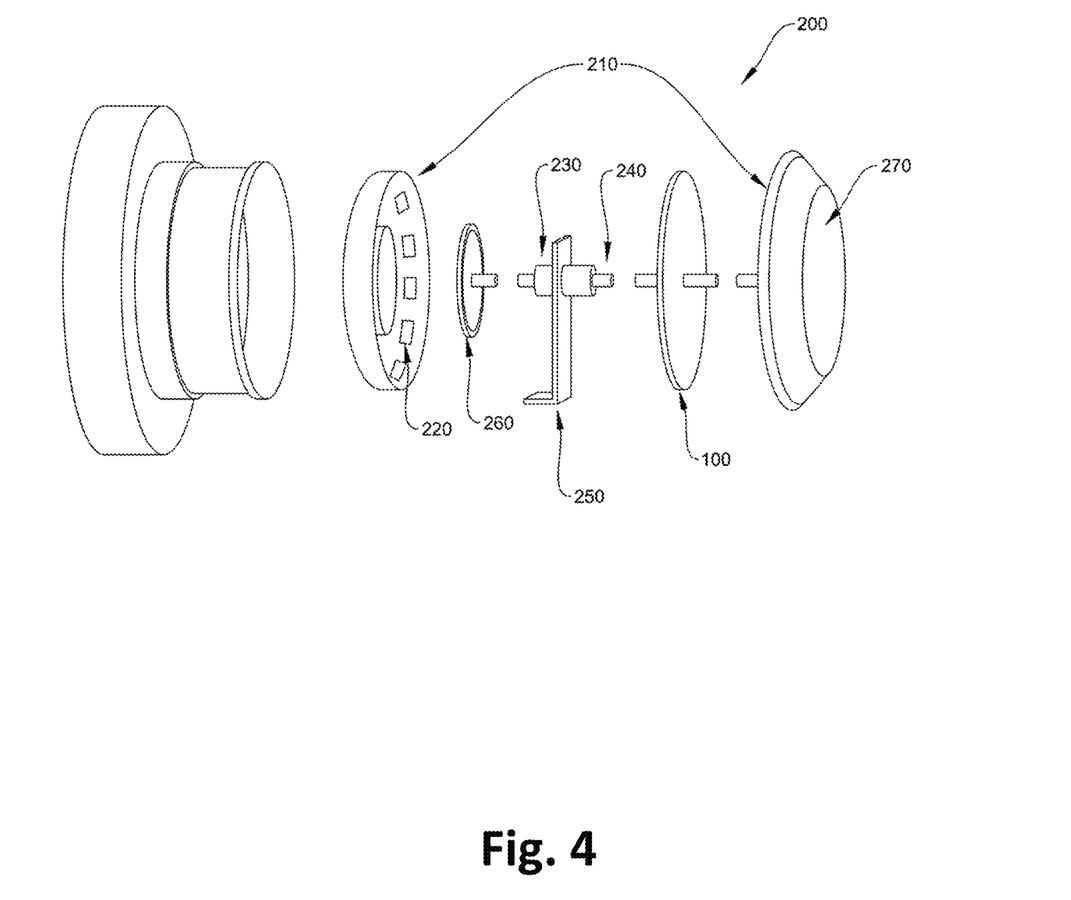
FIG. 4 is an exploded view of the assembly, according to an exemplary embodiment of the present invention.
Figure 5:
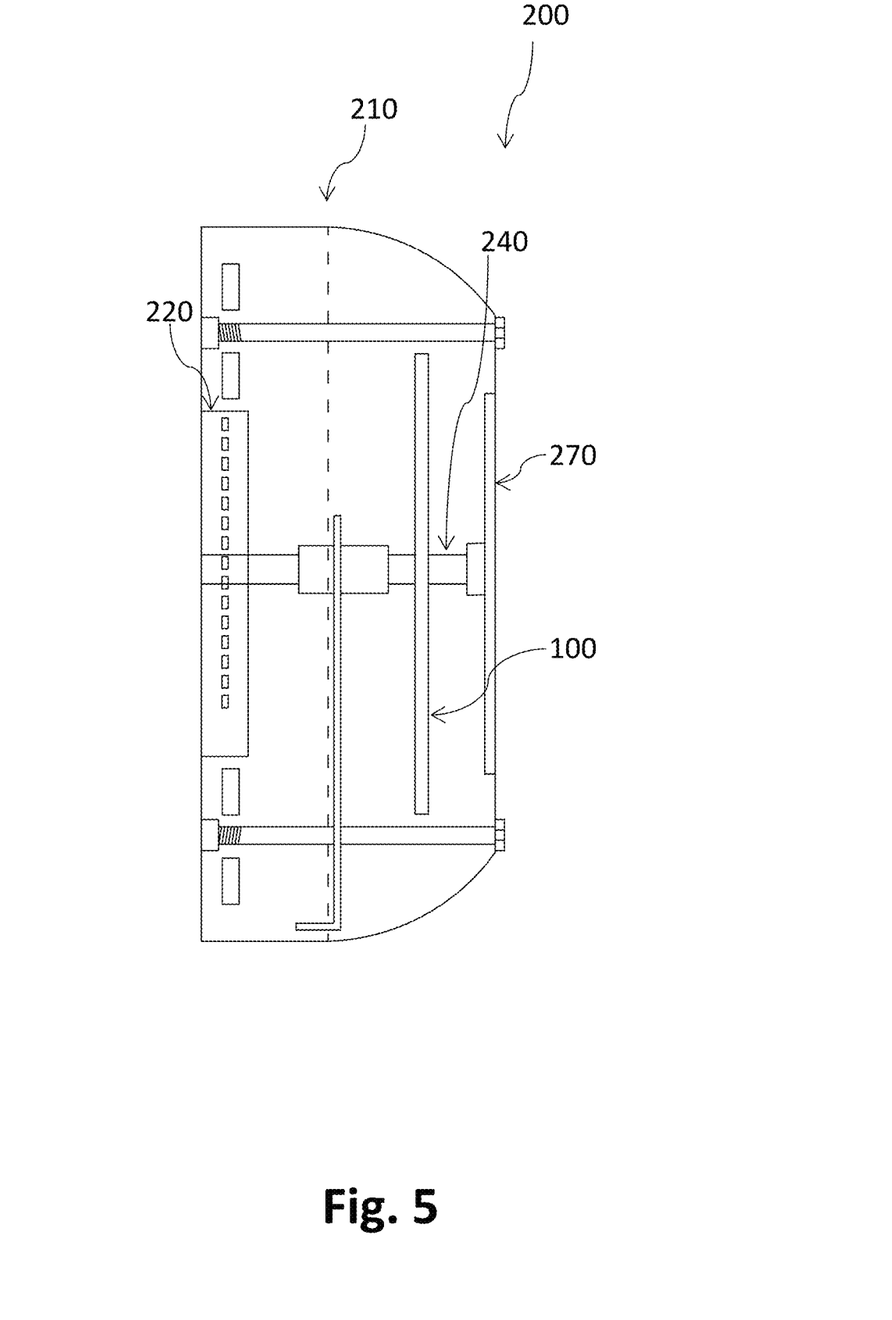
FIG. 5 is a schematic view of the assembly, according to an exemplary embodiment of the present invention.
Figure 6:
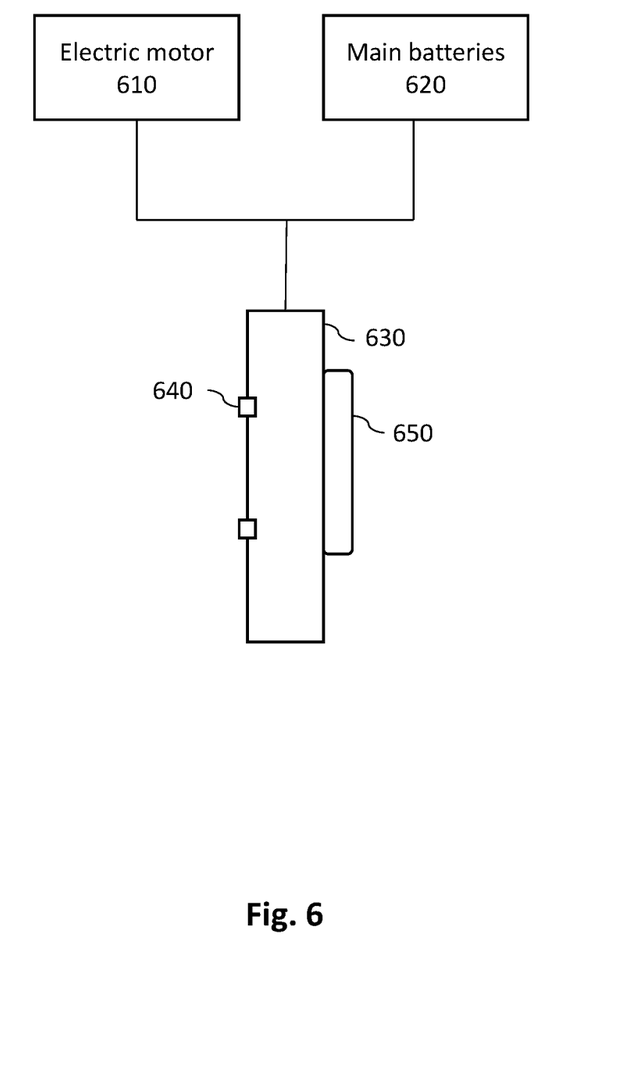
FIG. 6 is a block diagram showing the electric motors 610 and 620 of electric vehicle; housing 630, holes 640 in the housing for lug nuts, and a solar panel 650 coupled to the housing.

Referring to FIG. 4 is an exploded view of the disclosed assembly 200 and FIG. 5 shows a schematic view of the disclosed assembly 200. The assembly 200 can be installed on one, two, three, or all four wheels in a vehicle, one assembly installs on one wheel and the assemblies on different wheels are independent of each other. The assembly 200 includes a housing 210 that can be mounted to the wheel rim using the regular lug nuts and the holes in the wheel rims. No modification in the wheel rim may be required, and the invention can be readily adapted for retrofitting onto the wheels. The housing includes holes through which lug nuts can pass through. Thus, the assembly can be easily installed like changing a wheel, and can also be easily taken off from the wheel.

The disclosed assembly 200 includes multiple batteries 220 encased within the housing. The batteries can be rechargeable batteries, such as a lithium-ion battery that can be charged. In one implementation, about eight batteries can be included in the assembly. The eight batteries can be arranged radially along the circumference of the housing. The batteries can be equally spaced apart from one another such that to balance the weight. All the batteries can be connected to a charging circuitry (not shown). Preferably the assembly can include eight batteries, however, it is understood that the number of batteries can be varied, and one or more batteries is within the scope of the present invention.

The assembly further includes an electric generator 230 for generating electricity. The electric generator can be connected to the charging circuitry for supplying the generated electricity. The charging circuitry can use this energy to charge the batteries of the disclosed assembly. The charging circuitry of the assembly may also be connected to the charging circuitry of the vehicle to which the disclosed assembly is coupled. The charging circuitry of the disclosed assembly can transmit any excess energy received from the electric generator of the disclosed assembly to the charging circuitry of the vehicle for charging the main batteries of the vehicle. Also, the charging circuitry of the disclosed assembly can supply stored energy in the batteries of the disclosed assembly to the driving mechanism of the electric vehicle for powering the electric vehicle. The charging circuitry of the disclosed assembly can also supply the energy stored in the batteries of the disclosed assembly to the charging circuitry of the vehicle for charging the main batteries. The disclosed assembly can provide for trickle charging of the main batteries. The charging circuitry can include a control unit for managing the operation of the charging circuitry based on predefined rules. The charging circuitry of the assembly can be connected to the driving mechanism and/or the charging circuitry of the vehicle through wired or wireless energy transfer. For example, a conductor can connect the assembly to the vehicle. Alternatively, wireless energy transfer technologies, such as Bluetooth wireless energy transfer can be used to transfer energy from the disclosed assembly to the vehicle. One or more, preferably two, Bluetooth devices can be used for wireless energy transfer.

The assembly further includes a shaft 240 that can be rotatably mounted to the housing. The shaft can rotate freely relative to the housing and the wheel to which the assembly is mounted. The flywheel 100 can be coupled to the shaft and can rotate the shaft. The rotor of the electric generator can also be coupled to the shaft while the stator can be coupled to the housing using a bracket 250. Thus, the flywheel can rotate the shaft and the shaft rotates the rotor resulting in the generation of electricity.

In operation, the assembly can be mounted to a wheel of an electric vehicle using the lug nuts. When the wheel of the vehicle rotates i.e., when the vehicle moves, the flywheel also starts rotating with the wheel. Because of the design of the flywheel, in a short time, the flywheel starts rotating faster than the wheel of the vehicle to which the assembly is mounted. The faster rotating flywheel can generate a good amount of electricity without any cost. In one implementation, a friction plate 260 can be used to rotate the flywheel, wherein the friction plate is coupled to the shaft and can removably engage the housing. Once the desired speed can be attained in the flywheel, the friction plate is automatically removed from the housing, allowing the shaft to rotate independently of the housing and the wheel.

In one implementation, the disclosed assembly can also be used to power or recharge portable electronic devices. A suitable interface or charging port can be provided protruding from the housing that can be used to connect an external electronic device. Wireless charge transfer may also be an option to charge and power the external electronic device. For example, an air compressor, used to fill the air in the tire of the vehicle, can power the disclosed assembly. In certain implementations, the batteries of the disclosed assembly can also be charged from an external power supply.

In one implementation, the outer surface of the housing can be coupled to a solar panel that can be connected to the charging circuitry of the disclosed assembly. The energy harness through the solar panel can be used to charge the batteries, For example, when the vehicle is in a parked state in sunlight, the batteries can still keep charging by the sunlight. This is of advantage, saves energy, and is environment friendly. Both the main batteries of the vehicle and the batteries of the disclosed assembly can be charged using the solar energy harnessed by the disclosed assembly.

The disclosed assembly can also include suitable lights in the housing and be visible from the outside. These lights may be used as a beacon, warning lights, aesthetic lights, and also for seeking help. The lights can be provided along the periphery or center of the exposed surface of the housing. For example, the light can be in the form of an LED array extended around the solar panel. Or the light can be provided in the center of the solar panel itself. Yellow light or red light can be provided. The lights can be manually turned on or can be automatically turned on by the control unit of the disclosed assembly. For example, the control unit using certain sensors of the assembly, or the vehicle can detect a malfunction or failed state of the vehicle and automatically get turned on.

The disclosed assembly can be advantageous by providing an alternate source of electrical power to charge and operate an EV in a manner that is quick, easy, and effective. The disclosed assembly can be cost-effective does not take any inner space in the vehicle and can retrofit to any electric vehicle. The disclosed assembly can trickle charge the main car batteries and provide stand-alone emergency battery power to move the electric vehicle off the road to safety in the event of the main electric vehicle battery failure. Thus, the safety provided to the electric vehicle is the critical feature and advantage of the disclosed assembly. The disclosed assembly can generate free energy and extends the effective range of the electric vehicle. By having an auxiliary or reserve source of power that can be used in case of emergency, the driver of the vehicle can have a sense of security and peace of mind.

The energy generated without using fossil fuels by the disclosed assembly and the money saved may also qualify the disclosed assembly for a federal energy tax credit. The simpler installation allows owners to install the disclosed assembly and does not require any professional help, thus making the disclosed assembly more attractive to consumers. The free energy is created using the kinetic energy of the flywheel of the disclosed assembly which is a critical feature of the invention. The flywheel can be provided with lead weights coupled around the periphery of the rim-style flywheel. The inner body of the flywheel can be made from plastic which is both durable and light in weight. The flywheel can be made of polycarbonate. The weights in the form of lead weights can be around the periphery of the plastic body. The free-spinning flywheel design can rotate faster than the electric vehicle's wheel itself. This unique flywheel design results in an increased maximum revolution (10% to 50%) of the flywheel resulting in an increased power generation supplied by the alternator/motor along with a prolonged RPM run cycle of a flywheel which just like a spinning top the power wheel will continue to spin when the electric vehicle is stopped. The free-spinning flywheel gets its rotational start by simple friction contact with a specially designed wheel (with multiple teeth) on the end of the shaft which is riding inside a round cup located on the clam-shell housing that holds the flywheel and other components. This clamshell housing is bolted on the outside of one of the factory-supplied wheels with special longer lug nuts. The clamshell 270 can be made from pure plastic that is durable and strong. The clamshell can be made using 3D printing.

The housing can be made from plastic material and can open in two parts for encasing and repairing the different components encased within the housing. The housing can be sealably closed. The housing can have a clamshell design with an (18 gauge) water-tight vinyl plastic hub cap that fits into a (10 gauge) round solid carbon plastic plate that holds the electrical components and the flywheel.

In one implementation, the flywheel can be about ⅛" wide and made from polycarbonate. The shaft can be made from metal. Also, while installing the wheel, some space can be provided between the housing and the wheel for maintaining airflow for cooling the brake. Suitable aerodynamic air channels can also be made in the housing for allowing good flow that may be directed to the brake plates for cooling the same.

In one implementation, the batteries can be rechargeable D-size batteries of 12 V-48 amps power capacity. The batteries can be coupled to a rear metal plate of the housing in a balanced manner around the periphery of the circular metal plate. The metal plate can have holes for the lug nuts to pass through. For example, five holes in the center of the circular metal plate for lug bolts to pass through so that lug nuts can be used to mount the disclosed assembly to the EV. Standard lug nuts can be used to secure the disclosed assembly and four metal screws can be used to secure the front vinyl hub cap onto the circular rear metal plate. The balanced arrangement of the batteries can be a critical and advantageous feature that adds weight to the rim of the vehicle and the rotating balanced weight can add additional kinetic energy to the vehicle itself to help propel the vehicle down the road.

In one implementation, the disclosed assembly can further include a high pitch audible horn that can be triggered by the user when needed to signal for help or assistants in case of an emergency.

It is understood that the disclosed assembly can be adapted for varied sizes of wheels, such as standard wheels for cars and trucks. The size of batteries can also be adjusted based on the size of the assembly, for example, C and D types of batteries can be used. The disclosed assembly can include a motion detector built into the control unit that can direct the new energy into the internal batteries when the electric vehicle is running and/or into the electric vehicle's internal batteries when the electric vehicle is parked and not running. A switch can be provided in the electric vehicle that may allow switching from the main batteries of the electric vehicle to the internal batteries of the disclosed assembly. The switch can be connected to the control unit of the disclosed assembly.

In one implementation, the housing or parts of the housing can be made from impact-resistant plastic by any 3D printing process. The structure and function of electrical generators in well known in the art and suitable known electrical generators can be used in the disclosed assembly without departing from the scope of the present invention.

What is claimed is:

1. An assembly for use as an auxiliary power generation source for an electric vehicle, the assembly consisting of:
    a housing configured to be mounted to a wheel of the electric vehicle, the housing has holes for lug nuts to pass through for mounting the housing to the wheel;
    a plurality of first batteries mounted to the housing, the plurality of first batteries are radially arranged and evenly spaced from each other;
    a charging circuitry configured to charge the plurality of first batteries;
    a shaft mounted to the housing, wherein the shaft is freely rotatable relative to the housing; an electric generator mounted to the shaft and the housing, wherein the electric generator rotates with the shaft for generating electricity, the electric generator comprises a stator and a rotor, the stator or rotor is coupled to the shaft and the rotor or stator is coupled to the housing respectively;
    a flywheel mounted to the shaft, the flywheel is configured to rotate with the wheel and at a rate higher than the wheel, the flywheel configured to rotate the shaft which in turn rotates the stator or rotor of the electric generator for generating the electricity; and
    a friction plate coupled to the shaft, the friction plate is configured to removably and frictionally couple to the housing.

2. The assembly according to claim 1, wherein the plurality of first batteries comprises batteries in multiples of four.

3. The assembly according to claim 2, wherein the plurality of first batteries comprises eight batteries.

4. The assembly according to claim 3, wherein the plurality of first batteries are lithium-ion batteries.

5. The assembly according to claim 2, wherein the charging circuitry is configured to trickle charge one or more second batteries, the one or more second batteries are main batteries of the electric vehicle powering the electric motor thereof.

6. The assembly according to claim 1, wherein the charging circuitry is configured to power an electric motor of the electric vehicle using power stored in the plurality of first batteries.

7. The assembly according to claim 3, wherein the plurality of first batteries are rechargeable batteries.

8. A method for generating electricity for use as an auxiliary power generation source for an electric vehicle, the method comprising:
    providing an assembly for an electric vehicle, the assembly consisting of:
        a housing configured to be mounted to a wheel of the electric vehicle the housing has holes for lug nuts to pass through for mounting the housing to the wheel of the electric vehicle,
        a plurality of first batteries mounted to the housing, the plurality of first batteries are radially arranged and evenly spaced from each other,
        a charging circuitry configured to charge the plurality of first batteries,
        a shaft mounted to the housing, wherein the shaft is freely rotatable relative to the housing,
        an electric generator mounted to the shaft and the housing, wherein the electric generator rotates with the shaft for generating electricity, the electric generator comprises a stator and a rotor, the stator or rotor is coupled to the shaft and the rotor or stator is coupled to the housing respectively,
        a flywheel mounted to the shaft, the flywheel is configured to rotate with the wheel and at a rate higher than the wheel, the flywheel configured to rotate the shaft which in turn rotates the stator or rotor of the electric generator for generating the electricity, and
        a friction plate coupled to the shaft, the friction plate is configured to removably and frictionally coupled to the housing;
    mounting to the housing to the wheel, wherein holes in the housing juxtapose with holes in the wheel: and securing the housing to the wheel using the lug nuts, wherein rotation of the wheel causes the flywheel to rotate.

9. The method according to claim 8, wherein the housing is made from plastic.

10. The method according to claim 8, wherein the plurality of first batteries comprises batteries in multiples of four.

11. The method according to claim 10, wherein the plurality of first batteries comprises eight batteries.

12. The method according to claim 8, wherein the plurality of first batteries are lithium-ion batteries.

13. The method according to claim 8, wherein the charging circuitry is configured to trickle charge one or more second batteries, the one or more second batteries are main batteries of the electric vehicle for powering an electric motor thereof.

14. The method according to claim 8, wherein the charging circuitry is configured to power an electric motor of the electric vehicle using power stored in the plurality of first batteries.

15. The method according to claim 10, wherein the plurality of first batteries are rechargeable batteries.

16. The assembly according to claim 5, wherein the charging circuitry is configured to trickle charge the one or more second batteries using the energy stored in the plurality of first batteries.

17. The assembly according to claim 16, wherein the charging circuitry comprises a control unit for managing operation of the charging circuitry based on predefined rules.

18. The assembly according to claim 1, wherein the assembly further comprises a solar panel coupled to the housing.

* * * * *